(12) United States Patent
Danzig et al.

(10) Patent No.: US 8,923,131 B2
(45) Date of Patent: Dec. 30, 2014

(54) TRAFFIC MANAGEMENT IN A MULTI-CHANNEL SYSTEM

(75) Inventors: Joel I. Danzig, Alpharetta, GA (US); Michael R. Robinson, Atlanta, GA (US); Russell J. Nagle, Lancaster, MA (US); Karen M. Schramm, Needham, MA (US)

(73) Assignee: Broadcom Corporation, Irvine, CA (US)

( * ) Notice: Subject to any disclaimer, the term of this patent is extended or adjusted under 35 U.S.C. 154(b) by 381 days.

(21) Appl. No.: 13/028,717

(22) Filed: Feb. 16, 2011

(65) Prior Publication Data

US 2012/0039173 A1 Feb. 16, 2012

Related U.S. Application Data

(60) Provisional application No. 61/305,066, filed on Feb. 16, 2010.

(51) Int. Cl.
*H04L 12/26* (2006.01)
*H04L 12/28* (2006.01)
*H04L 12/701* (2013.01)
*H04L 12/801* (2013.01)
*H04L 12/851* (2013.01)
*H04L 12/825* (2013.01)
*H04L 12/835* (2013.01)
*H04L 29/06* (2006.01)

(52) U.S. Cl.
CPC ............ *H04L 12/2801* (2013.01); *H04L 45/00* (2013.01); *H04L 47/10* (2013.01); *H04L 47/2441* (2013.01); *H04L 47/263* (2013.01); *H04L 47/30* (2013.01); *H04L 69/14* (2013.01); *Y02B 60/31* (2013.01); *Y02B 60/33* (2013.01)
USPC ....................................... 370/235.1; 370/235

(58) Field of Classification Search
CPC ...... H04L 12/2801; H04L 45/00; H04L 47/10; H04L 47/2441; H04L 47/263; H04L 47/30; H04L 69/14; Y02B 60/31; Y02B 60/33
USPC .............. 370/229, 235, 235.1, 236, 431, 464, 370/465
See application file for complete search history.

(56) References Cited

U.S. PATENT DOCUMENTS 7,532,627 B2 * 5/2009 Chapman et al. ......... 370/395.41
7,912,050 B2 * 3/2011 Lee et al. ...................... 370/389

(Continued)

*Primary Examiner* — Chi H Pham
*Assistant Examiner* — Robert Lopata
(74) *Attorney, Agent, or Firm* — Sterne, Kessler, Goldstein & Fox P.L.L.C.

(57) ABSTRACT

A method, system and computer program product in a downstream line card of a Cable Modem Termination System (CMTS) for managing downstream traffic for channels and bonded channel groups is provided herein. The method comprises the step of receiving packets for transmission to cable modems and classifying each packet to a flow based on class of service associated with the packet. The method further includes the step of storing the packets in flow queues based, wherein a flow queue is selected based on a flow a packet is associated with and wherein each flow corresponds to a single flow queue. The method also includes transmitting the packets from the flow queues to channel queues or bonded channel queues using corresponding channel nodes or bonded channel nodes at a rate that is determined based on feedback data and scheduling downstream transmission of packets on a single downstream channel if the packet is stored in a channel queue and on multiple downstream channels that are bonded together to form a bonded channel group if the packet is stored in a bonded channel queue. The feedback data is adjusted for each channel node or bonded channel node based on a queue depth for a corresponding channel queue or bonded channel queue.

33 Claims, 7 Drawing Sheets

(56) References Cited

U.S. PATENT DOCUMENTS

| | | | |
|---|---|---|---|
| 7,983,295 B2* | 7/2011 | Cummings | 370/465 |
| 8,040,807 B2* | 10/2011 | Pai et al. | 370/236 |
| 8,059,546 B2* | 11/2011 | Pai et al. | 370/236 |
| 8,160,098 B1* | 4/2012 | Yan et al. | 370/468 |
| 8,310,926 B1* | 11/2012 | Bernstein et al. | 370/230 |
| 8,468,572 B2* | 6/2013 | Liu et al. | 725/94 |
| 2007/0133588 A1* | 6/2007 | Kwon et al. | 370/431 |
| 2010/0061234 A1* | 3/2010 | Pai et al. | 370/230.1 |
| 2010/0162337 A1* | 6/2010 | Lee et al. | 725/111 |

\* cited by examiner

TRAFFIC MANAGEMENT IN A MULTI-CHANNEL SYSTEM

CROSS REFERENCE TO RELATED APPLICATIONS

This application claims the benefit of U.S. Provisional Application No. 61/305,066 filed Feb. 16, 2010, which is incorporated herein by reference in its entirety.

BACKGROUND OF THE INVENTION

1. Field of the Invention

This invention is generally related to traffic management in a downstream line card.

2. Background Art

In a Data Over Cable Service Interface Specification (DOCSIS) system, a Cable Modem Termination System (CMTS) transmits downstream network traffic to a cable modem using the DOCSIS protocol over one or more Quadrature Amplitude Modulated (QAM) channels. In the simplest case, downstream data is transmitted over a single channel to the cable modem thereby limiting the bandwidth to the maximum rate supported by the single channel. The downstream bandwidth can be increased by using multiple channels for a data flow which is referred to as "channel bonding." A set of channels used for channel bonding may be referred to as a "bonded channel group." The maximum possible rate for a bonded channel group is the sum of the maximum rates of the channels that comprise the group. Furthermore multiple bonded channel groups can exist in a single DOCSIS system.

Channel bonding adds complexity to the scheduling of downstream network traffic entering a CMTS. In systems without channel bonding, each data flow is associated with a single channel. Each channel can have multiple data flows associated with it. The traffic from the associated data flows is simply shaped to the maximum rate supported by the channel. However, with the introduction of channel bonding, a data flow is either associated with a single channel or to one of the bonding channel groups. Since each channel may correspond to one or more bonded channel groups as well as being a standalone channel, simply rate-shaping each channel and bonded channel group to its maximum possible rate may result in an oversubscription scenario where packets are dropped.

Methods, systems and computer program products are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates an example communication system according to an embodiment of the invention.

FIG. 2 further illustrates the communication system according to an embodiment of the invention.

FIG. 3 further illustrates downstream line card according to an embodiment of the invention.

FIG. 4 further illustrates downstream line card according to an embodiment of the invention.

Figure 1:
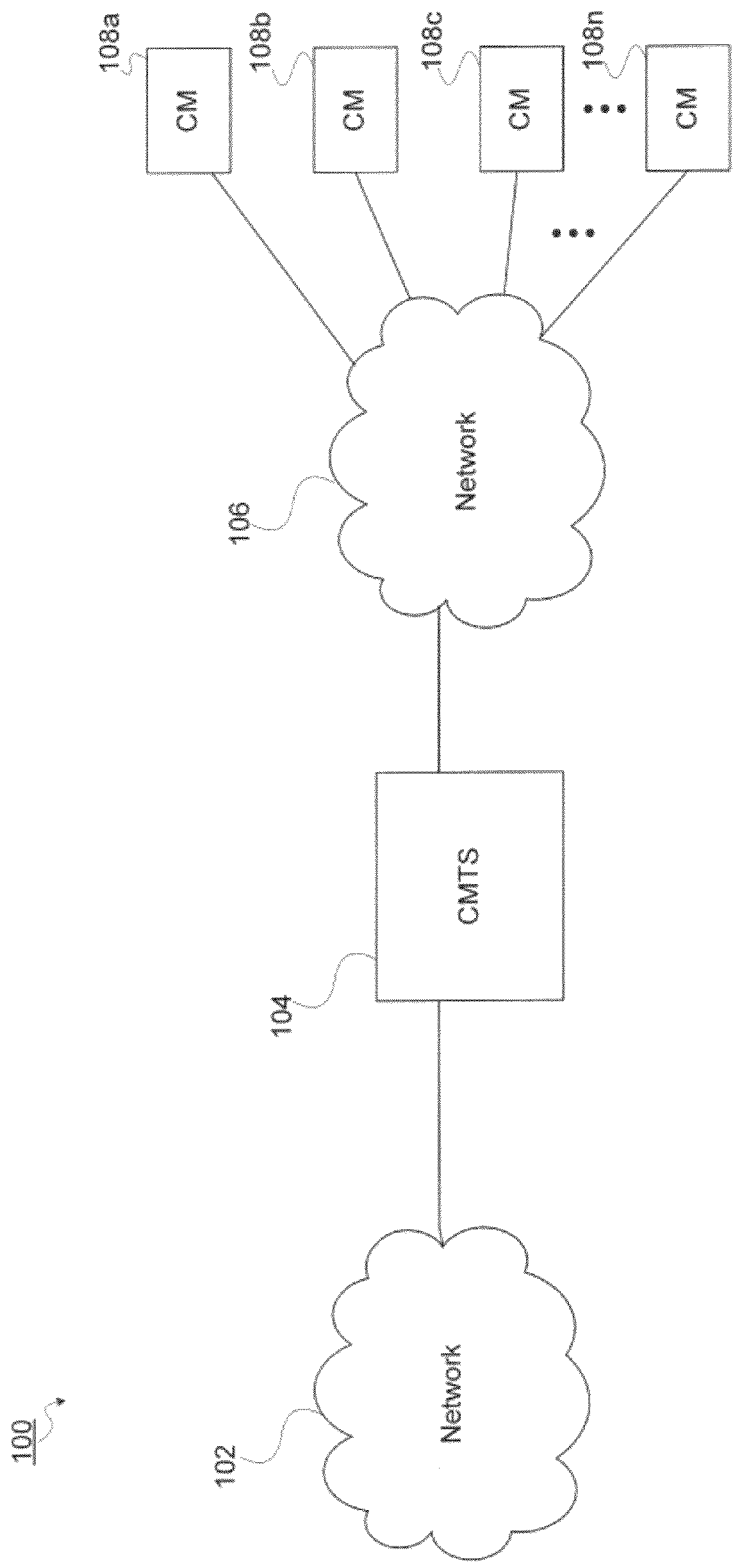

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

FIG. 1 illustrates an example communication system 100 according to an embodiment of the invention. Communication system 100 includes a cable modem termination system (CMTS) 104 coupled to a network 102. CMTS 104 is coupled to cable modems 108*a-n* via network 106. Network 102 may be, for example, the Internet. Network 106 may be, for example, a Hybrid Fiber Coaxial (HFC) network. Network 102 and network 106 may be wired or wireless networks. It is to be appreciated that the type of network for networks 102 and 106 may be arbitrary. Cable modem termination system 104 may communicate with cable modems 108*a-n* using the DOCSIS protocol. Data transmitted by CMTS 104 to cable modems 108*a-n* is referred to as a "downstream" transmission. Data received from cable modems 108*a-n* is referred to as an "upstream" transmission. CMTS 104 and cable modems 108 may support channel bonding. In channel bonding, data is transmitted downstream to a cable modem 108 on multiple channels that are part of a bonded channel group. CMTS 104 schedules downstream transmissions to cable modems 108. Scheduling and rate-shaping downstream transmissions to cable modems 108 that support channel bonding presents challenges as described below.

Figure 2:
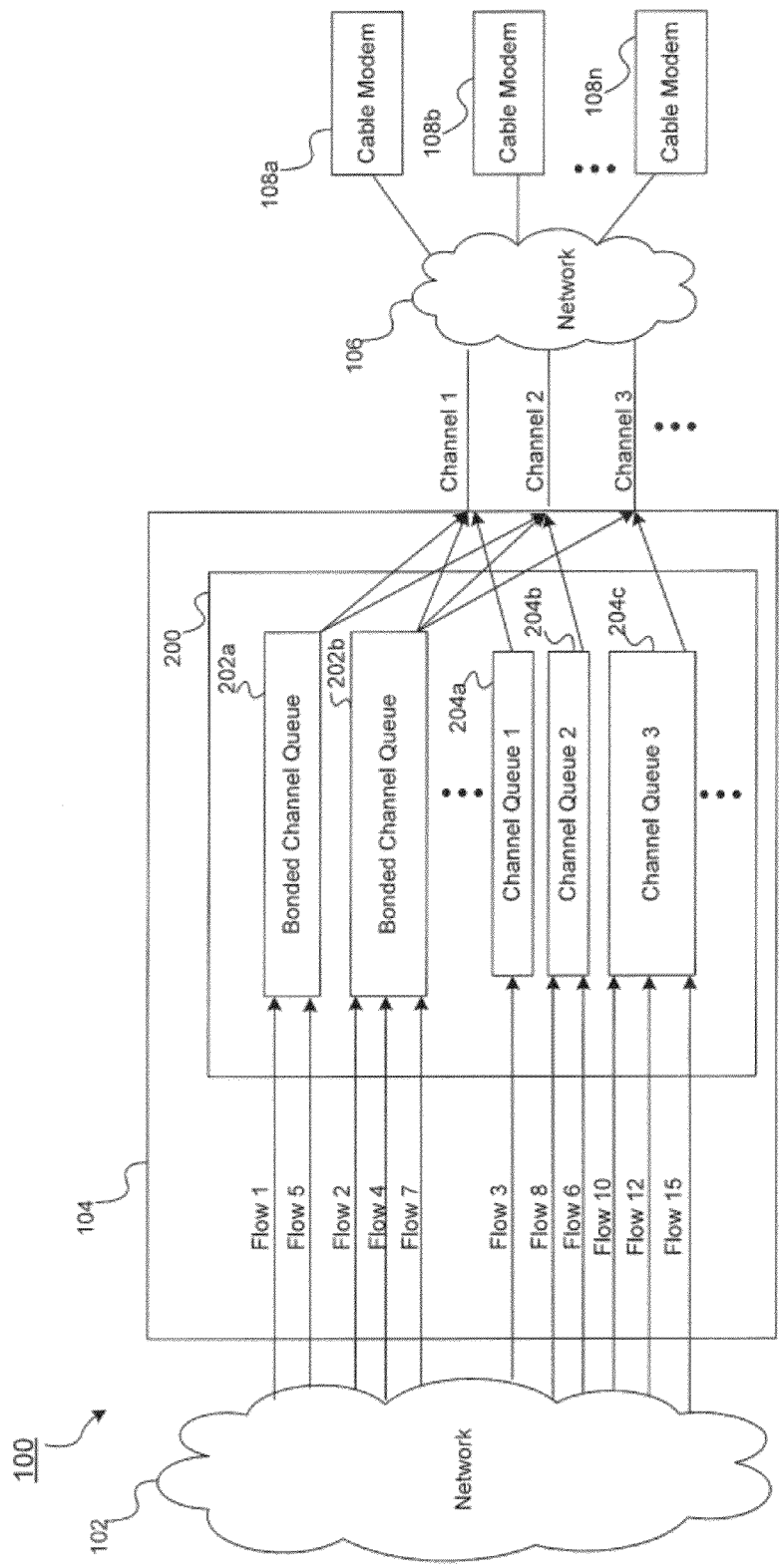

FIG. 2 further illustrates communication system 100 according to an embodiment of the invention.

CMTS 104 includes a downstream line card 200. Downstream line card 200 includes bonded channel queues 202 and channel queues 204. Bonded channel queues 202 transmit data on bonded channel groups that include multiple channels. For example, bonded channel queue 202*a* transmits data on channels 1 and 2 that are part of a first bonded channel group. Bonded channel queue 202*b* transmits data on channels 1, 2 and 3 that are part of a second bonded channel group. Channel queues 204 can transmit data on a single channel that they are associated with. For example, channel queue 204*a* transmits data on channel 1, channel queue 204*b* transmits data on channel 2 and channel queue 204*c* transmits data on channel 3. Each of the bonded channel queues 202 and channel queues 204 receive data from flows that may originate over network 102.

In the example in FIG. 2, flow 1 and flow 5 are associated with bonded channel queue 202*a*. Bonded channel queue 202*a* corresponds to a bonded channel group that transmits data on channel 1 and channel 2. Since bonded channel queue 202*a* transmits data on channels 1 and 2, data from flows 1 and 5 are transmitted on channels 1 and 2. Flows 2, 4, and 7 are associated with bonded channel queue 202*b*. Bonded channel 202*b* transmits data over a bonded channel group that includes channels 1, 2 and 3 and therefore data from flows 2, 4 and 7 is transmitted on channels 1, 2 and 3. Flow 3 is associated with channel queue 204a that also transmits data on channel 1. Flows 8 and flow 6 correspond to channel queue 204b that transmits data on channel 2. Flows 10, 12 and 15 correspond to channel queue 204c that transmits data on channel 3.

In the example in FIG. 2, channel 1 is utilized by bonded channel queue 202a, bonded channel queue 202b and channel queue 204a. Channel 2 is utilized by bonded channel queue 202a, bonded channel queue 202b and channel queue 2. Channel 3 is utilized by bonded channel queue 202b and channel queue 3.

Each of channels 1, 2 and 3 may have a maximum data transmit rate of 50 megabits per second (mbps). In a legacy system, where only a single channel queue corresponds to a single channel, the traffic for each channel would rate-shaped to 50 Mbps. With the addition of the bonding queues 202a and 202b, each channel has to support a higher transmit data rate. Bonding queue 202a transmits on the first bonded channel group that has channels 1 and 2 resulting in a maximum bandwidth of 2×50 mbps, or 100 mbps. So the traffic being sent to the first bonded channel group is rate-shaped to 100 mbps. However, in conventional systems, channel queues 204 and bonded channel queues 202 are not aware of each other's bandwidth requirements. Now let's say that traffic from flows 1 and 5 that correspond to bonded channel queue 202a reaches 100 mbps. The combined channels 1 and 2 have enough capacity to support bonded channel queue 202a since channels 1 and 2 combined can support 100 mbps which is their maximum capacity. However, channels 1 and 2 have no more bandwidth available to support traffic from channel queues 204a and 204b. So let's say that 1 mbps of traffic is received from flow 3 that targets channel queue 204a. In this example, downstream line card 200 will be unable to support the 1 mpbs traffic resulting in an oversubscription of channel 1. As a result, packets corresponding to channel 1 will back up and eventually be dropped.

The above example of oversubscription gets more complex with the addition of overlapping bonding groups. For example, the second bonded channel group used by bonded channel queue 202b that uses channels 1, 2 and 3 would be rate-shaped to 150 mbps. So now, channel 2 is used by three rate-shapers for each of channel queue 204b, bonded channel queue 202a, and bonded channel queue 202b. As in the example above, channel 2 can be oversubscribed by the three individual rate shapers. Similarly, channel 3 which is utilized by bonded channel 202b and channel queue 204c may also be oversubscribed in conventional systems. In a conventional system, each of channels 1, 2 and 3 will be rate shaped to their maximum level without taking into account the number of flows that are being transmitted per channel, the number of channel queues and the bonded channel queues that are serviced per channel. In addition to channel and bonded channel group rates, individual data flows 1-15 may also have constraints. These constraints can include parameters, including but not limited to, maximum data rate, guaranteed minimum rate, flow priority, multicast, etc. Prioritizing data from multiple flows having diverse constraints for bonded channels may also not be supported by conventional systems. The embodiments presented herein provide a solution to the scheduling and rate shaping of multiple flows and multiple bonded channel groups.

Downstream Line Card architecture

Figure 3:
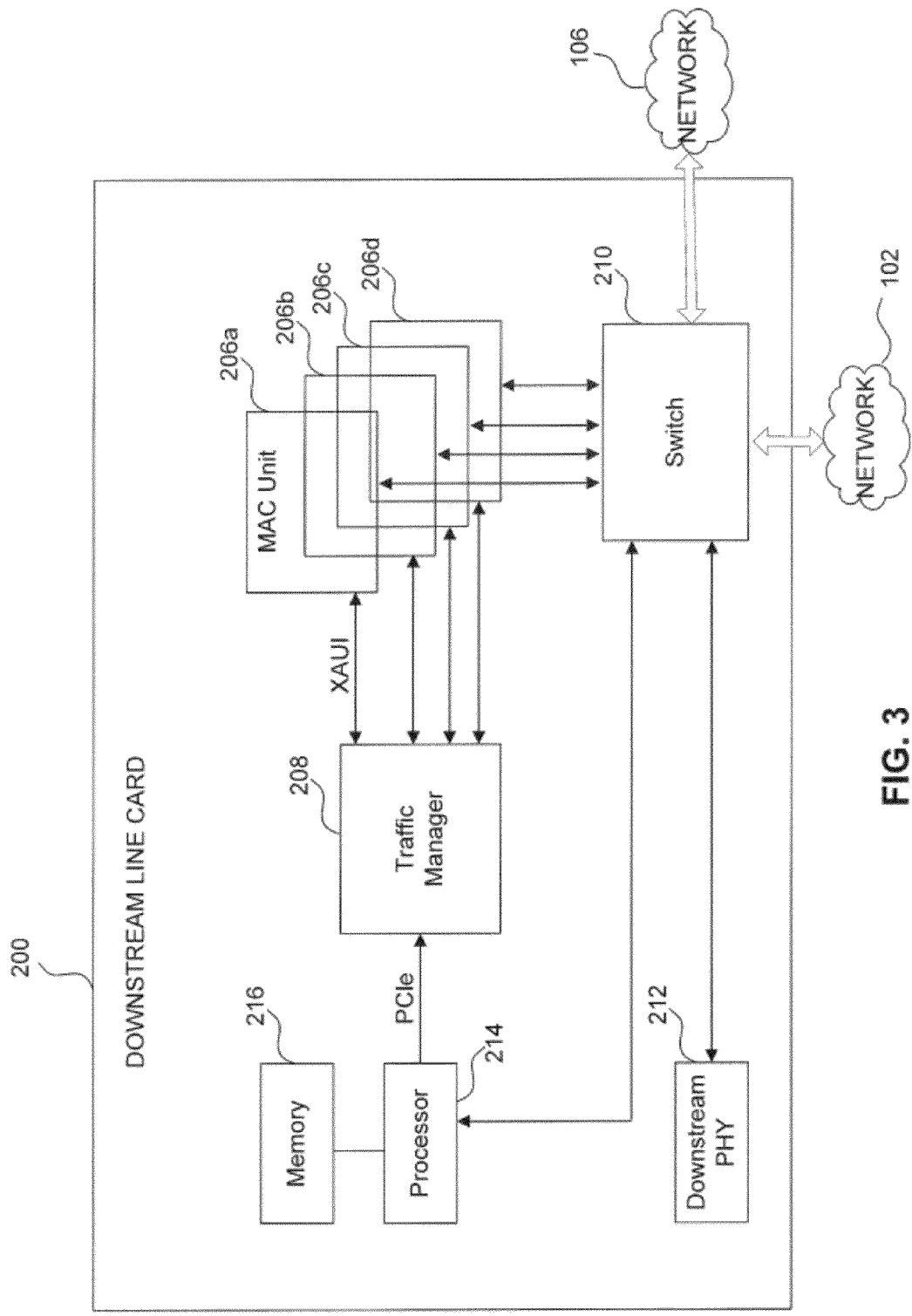

FIG. 3 illustrates a downstream line card 200 according to an embodiment of the invention. Downstream line card 200 includes a traffic manager 208 that is coupled to a plurality of MAC units 206. Traffic manager 208 may be coupled to MAC units 206 using a 10 Gigabit Attachment Unit Interface (XAUI) interface. MAC units 206a-d are coupled to switch 210. Switch 210 is coupled to downstream Physical (PHY) interface and to processor 214. Processor 214 is coupled to traffic manager 208 and to memory 216. Processor 214 is coupled to perform the function described herein based on instructions stored in memory 216. Processor 214 may be coupled to traffic manager 208 using a Peripheral Component Interconnect Express (PCIe) interface. Switch 210 communicates with network 102 and network 106. In an example data from incoming flows, such as flows 1-15 in FIG. 2, is received via switch 210. Data may be transmitted downstream to cable modems 108a-n via switch 210 as well.

Each MAC unit 206 receives packets from switch 210. MAC unit 206 classifies a packet to a flow based on a class of service associated with the packet. MAC units 206 transmit the packets to traffic manager 208 for storage in flow queues. MAC units 206 periodically receive packets from traffic manager 208, store the packets and schedule them for transmission via switch 210 to cable modems 108. According to an embodiment, MAC units 206, based on queue depths for bonded channel queues 202 and channel queues 204, generate feedback signals to traffic manager 208 to increase or decrease a rate at which packets are transmitted by traffic manager 208 to each MAC unit 206 as will be described in further detail below. By controlling the rate at which packets are received from traffic manager 208, MAC units 206 rate shape each downstream channel and thereby avoid oversubscription of channels.

Traffic manager 208 receives packets from MAC units 206 and buffers the packets in flow queues. According to an embodiment of the invention, each flow is associated with a dedicated flow queue. Traffic manager 208 transmits packets from flow queues to MAC units 206 at a rate based on feedback signals received from MAC units 206. In an example, the feedback signal is sent by MAC units 206 via switch 210 and processor 214. In another example, MAC units 206 directly transmit the feedback signal to traffic manager 208. MAC units 206 and traffic manager 208 are described in further detail below.

Figure 4:
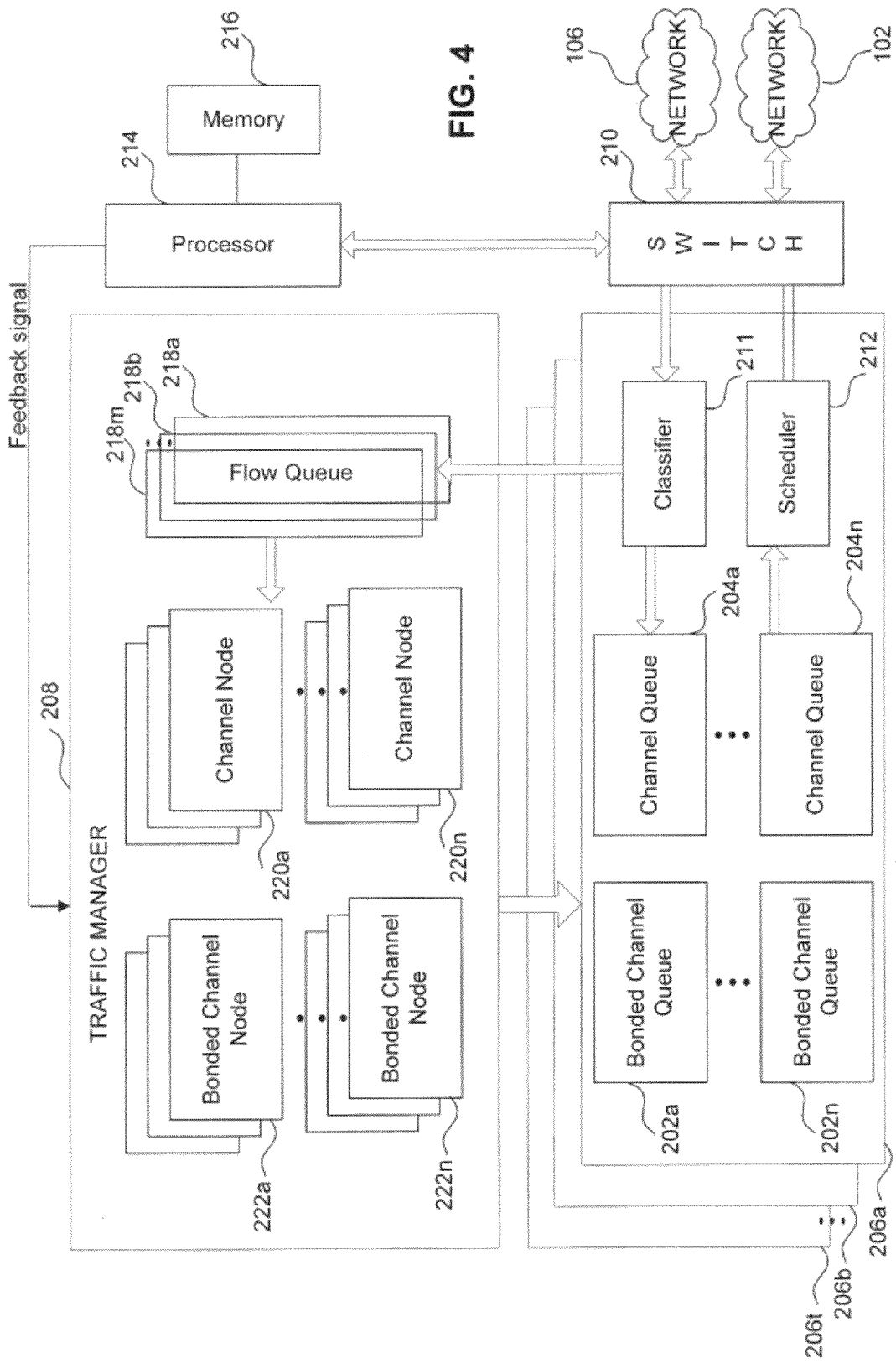

FIG. 4 further illustrates downstream line card 200 according to an embodiment of the invention.

Each MAC unit 206 includes a classifier 210 and a scheduler 212 coupled to channel queues 204 and bonded channel queues 202. Traffic manager 208 includes flow queues 218 coupled to channel nodes 220 and bonded channel nodes 222. Each channel queue 204 transmits on a single downstream channel and each bonded channel queue 202 transmits on multiple channels that are part of a bonded channel group. In contrast, conventional systems do not have separate channel queues 204 and separate bonded channel queues 202 and are hence unable to rate shape data on a per channel or bonded channel group basis. Furthermore, conventional systems do not have channel nodes or bonded channel nodes corresponding to each channel queue and bonded channel queue and are hence unable to rate-shape data on a per channel queue or per bonded channel queues basis leading to channel oversubscription.

Switch 210 receives packets from network 102 for downstream transmission to cable modems 108. Classifier 211 receives these packets from switch 210. Classifier 211 classifies a packet to a flow based on a class of service (CoS) and Quality of Service (QoS) parameters associated with the packet. The parameters may be determined based on, for example, the contents of the header of the packet, the incoming port etc. The class of service may be, for example, best effort service, unsolicited grant service (UGS) etc. The classifier appends classification data to each packet that indicates a flow that the packet is classified to. Each flow is provisioned to a channel node 220 or bonded channel node 222 based on the class of service supported by the channel node 220 or bonded channel node 222. The provisioning of a flow to a channel node 220 or a bonded channel node 222 may be done either statically or dynamically during run time by, for example, a cable operator. Classifier 211 stores packets that are management packets directly in a channel queue 204 or a bonded channel queue 202. Management packets may be packets associated with administrative functions such as, including but not limited to, DOCSIS MAP messages. For packets that are not management packets, classifier 211 transmits the packets to traffic manager 208. Traffic manager 208 stores the packet received from classifier 211 in one of flow queues 218.

Traffic manager 208 includes a flow queue 218 for each flow serviced by downstream line card 200. For example, each of flows 1-15 illustrated in FIG. 2 has its own dedicated flow queue 218. In an embodiment, flow queues 218 are hardware-based queues and are not software-based queues. In another embodiment, flow queues 218 are software-based queues. Hardware-based flow queues 218 are typically faster than software-based queues. In an example, the packet received from classifier 211 is stored external to downstream line card 200 and only an identifier, such as an indirect memory address that indicates the location of the packet in the external memory, is stored in a flow queue 218. Storing the packet external to line card 200 results in reduced memory requirement on downstream line card 200.

According to an embodiment of the invention, each channel node 220 is associated with a corresponding channel queue 204 and each bonded channel node 222 is associated with a corresponding bonded channel queue 202. For example, channel node 220a is associated with channel queue 204a and bonded channel node 222a is associated with bonded channel queue 202a. There is a single traffic manager 208 for the multiple MAC units 206. According to an embodiment of the invention, traffic manager 208 has a set of channel nodes 220 and bonded channel nodes 222 corresponding to the channel queues 204 and bonded channel queues 202 for each MAC unit 206.

According to an embodiment of the invention, channel nodes 202 and bonded channel nodes 222 rate-shape flows for channels and bonded channel groups respectively. Each channel node 220 transmits packets from flow queues 218 to a corresponding channel queue 204 at a transmit rate that is based on an associated feedback signal generated by scheduler 212. Similarly, each bonded channel node 222 transmits packets from flow queues 218 to a corresponding bonded channel queue 202 based on an associated feedback signal generated by scheduler 212. Flow queues 218 are associated with a channel node or a bonded channel node based on provisioning by the cable modem termination system 104 on start up. For example, if flows 1 and 5 correspond to bonded channel queue 202a (see FIGS. 2 and 4), then the flow queues 218 that store flows 1 and 5 will be associated with corresponding bonded channel node 222a. If flows 2, 4 and 7 are associated with bonded channel queue 202b (see FIGS. 2 and 4), then flow queues that store flows 2, 4 and 7 are associated with bonded channel node 222b. Similarly, channel queue 204a is associated with flow 3 (see FIGS. 2 and 4) and hence the flow queue 218 that stores flow 3 is associated with channel node 220a.

Scheduler 212 is configured to monitor the queue depth of channel queues 204 and bonded channel queues 202. "Queue depth" as referred to herein is the percentage that a queue is full. For example, a queue depth of 20% indicates that the queue is full up to 20% of its full capacity. Alternatively, queue depth may refer to the number of packets stored in a queue. For example, a queue depth of 12 may indicate that the queue has 12 packets. In an embodiment, scheduler 212 may use graduated thresholds. For example, if the queue depth for a channel queue 204 or a bonded channel queue increases past a first threshold, then a corresponding feedback signal decreases a transmit rate from the corresponding channel node 220 or bonded channel node 222 by a first rate. If the queue depth for a channel queue 204 or a bonded channel queue increases past a second threshold, then a corresponding feedback signal decreases a transmit rate from the corresponding channel node 220 or bonded channel node 222 by a second rate which is higher than the first rate. Similarly, a transmit rate is gradually increased if the queue depth decreases below one or more thresholds. If the queue depth is substantially equal to the lowest threshold, then the transmit rate may be maintained. It is to be appreciated that the number of thresholds is a design choice and may be arbitrary. Furthermore, the thresholds and rates can be modified during startup or dynamically during runtime using configuration files.

Figure 5:
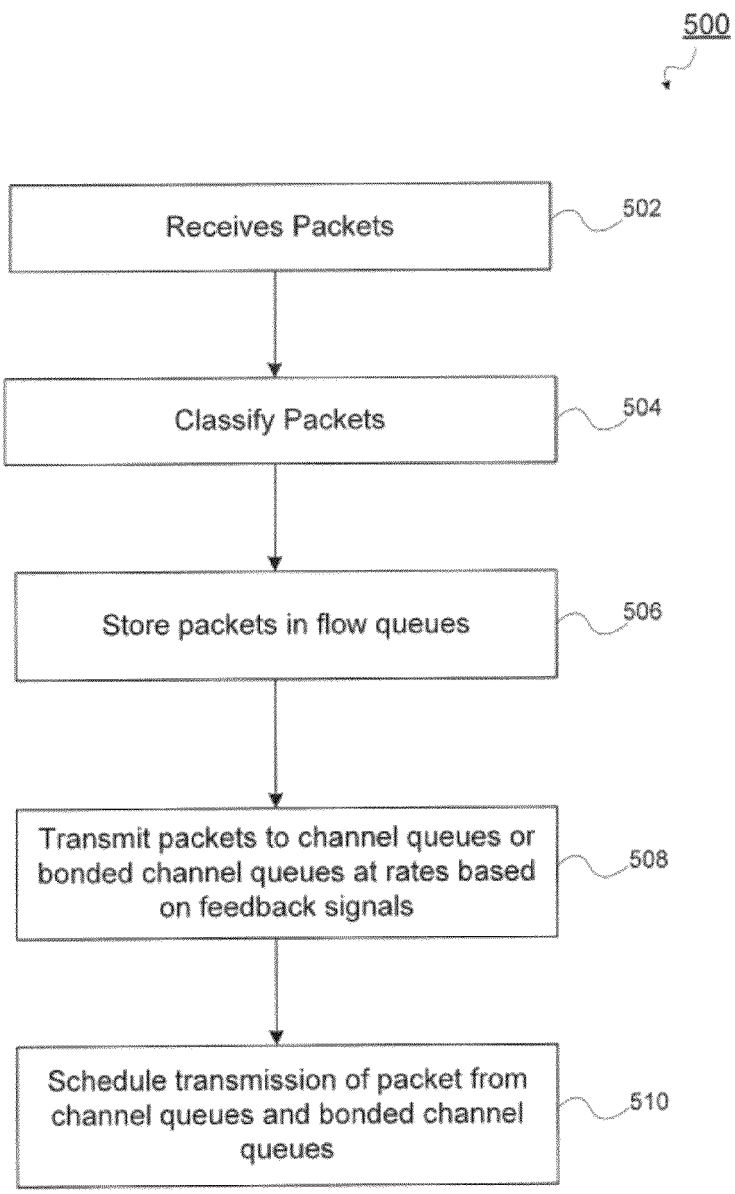
FIG. 5 illustrates an example flowchart showing steps performed by downstream line card according to an embodiment of the invention.

FIG. 5 illustrates an example flowchart 500 showing steps performed by downstream line card 200 according to an embodiment of the invention. Flowchart 500 will be described with continued reference to the example operating environment depicted in FIGS. 1-4. However, the flowchart is not limited to this embodiment. Note that some steps shown in flowchart 500 do not necessarily have to occur in the order shown. The steps in flow chart 500 may be performed by, for example, traffic manager 208 and MAC units 206.

In step 502, packets are received. For example, classifier 211 receives packets from network 102 via switch 210.

In step 504, packets are classified. For example, classifier 211 classifies a packet to a flow based on a class of service a packet is associated with. Based on the flow that the packet is classified to, the packet is associated with a channel node 220 or a bonded channel node 222 that is provisioned for that flow.

In step 506, packets are stored in flow queues. For example, classifier 211 transmits the classified packets to flow queues 218 for storage based on the flow that a packet is associated with. If packets are management packets such as DOCSIS MAP messages, then the management packets are directly stored in channel queues 204 or bonded channel queues 202.

In step 508, packets are transmitted to channel queues or bonded channel queues at a rate based on a feedback signal. For example, channel node 220 and bonded channel nodes 222 transmit packets to corresponding channel queues 204 and bonded channel queues 202 based on feedback signals received from scheduler 212.

In step 510, transmission of packets from channel queues and bonded channel queues are scheduled. For example, scheduler 212 schedules downstream transmission of packets from channel queue 204 or bonded channel queues 202 down individual channels or down multiple channels that are part of a bonded channel group.

Figure 6:
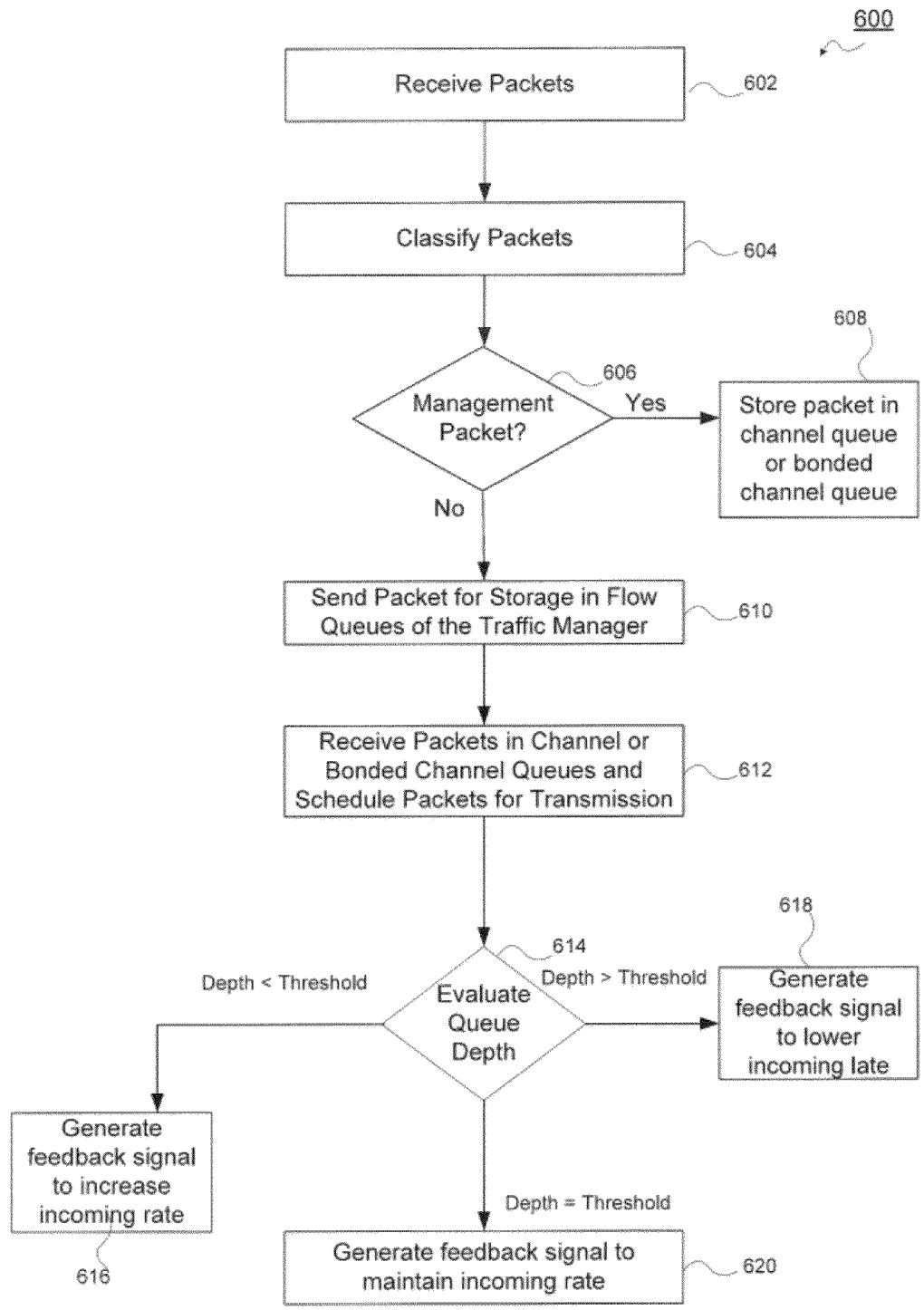
FIG. 6 illustrates an example flowchart showing steps performed by a Media Access Control (MAC) unit according to an embodiment of the invention.

FIG. 6 illustrates an example flowchart 600 showing steps performed by a MAC unit 206 according to an embodiment of the invention. Flowchart 600 will be described with continued reference to the example operating environment depicted in FIGS. 1-4. However, the flowchart is not limited to this embodiment. Note that some steps shown in flowchart 600 do not necessarily have to occur in the order shown. The steps in flow chart 500 may be performed by, for example, MAC units 206.

In step 602, packets are received. For example, packets are received from network 102 via switch 210.

In step 604, packets are classified. For example, classifier 211 classifies a packet to a flow based on a class of service the packet is associated with. Based on the flow that the packet is classified to, the packet is associated with a channel node 220 or a bonded channel node 222 that is provisioned for that flow.

In step 606, it is determined whether a packet is a management packet. For example, DOCSIS MAP messages are determined to be management packets. If it is determined that the packet is a management packet, then the process proceeds to step 608. If it is determined, that the packet is not a management packet, then the process proceeds to step 610.

In step 608, the management packet is stored in a channel queue or a bonded channel queue. For example, the management packet is stored in a channel queue 204 or a bonded channel queue 202.

In step 610, the packet is transmitted to a traffic manager for storage and feedback signals are generated to control a rate at which packets are received back from the traffic manager. For example, the packet is transmitted to a traffic manager 208 and stored in a flow queue 218 and feedback signals generated by scheduler 212 are sent to the traffic manager 208 to control a rate at which packets are received back from the traffic manager 208. The flow queue 218 in which the packet is stored is determined based on the flow that the packet is associated with.

In step 612, packets are received in MAC unit queues from the traffic manager and are scheduled for transmission. For example, scheduler 212 retrieves packets from channel queues 204 or bonded channel queues 202 and transmits the packets down a single downstream channel or down multiple downstream channels of a bonded channel group based on whether the packet is retrieved from a channel queue 204 or a bonded channel queue 202 respectively.

In step 614, queue depth is evaluated for each channel queue and each bonded channel queue. For example, queue depth for each channel queue 204 and each bonded channel queue 202 is evaluated.

If it is determined that the queue depth exceeds one or more thresholds, then the process proceeds to step 618. If it is determined that queue depth is less than one or more thresholds then the process proceeds to step 616. If it is determined that the queue depth is equal to one or more thresholds then the process proceeds to step 620.

In step 618, a feedback signal is generated to lower the incoming packet rate, based on the threshold(s) crossed. For example, if the queue depth for a channel queue 204 is above a threshold then the feedback signal may indicate to the corresponding channel node 220 to lower the rate at which a channel node 220 or a bonded channel node 222 is sending packets to a corresponding channel queue 204 or a bonded channel queue.

In step 616, a feedback signal is generated to increase the incoming packet rate, based on the threshold(s) crossed. For example, if the queue depth for a channel queue 204 is below a threshold then the feedback signal may indicate to the corresponding channel node 220 or a bonded channel node 222 to increase the rate at which it is sending packets to a corresponding channel queue 204 or a bonded channel queue 202.

In step 620, a feedback signal is generated to maintain the incoming packet rate, if the incoming packet rate is equal to a threshold. For example, if the queue depth for a channel queue 204 is substantially equal to a threshold then the feedback signal may indicate to a channel node 220 or a bonded channel node 222 to maintain the rate at which it is sending packets to a corresponding channel queue 204 or a bonded channel queue 202.

The queue depth for queues is based on the rate at which packets can be transmitted downstream by scheduler 212. In an example, the packet rate is increased or decreased gradually based on multiple threshold levels for the queue depth. If the queue depth crosses more than one threshold, then the transmit rate is gradually decreased further. For example, if a queue depth for a bonded channel queue 202 is past a first threshold of, for example 5 packets, then the rate at which packets are transmitted by a corresponding bonded channel node 222 may be decreased by 2 packets/second. If the queue depth for a bonded channel 202 queue is past a second threshold of 7 packets then the rate at which packets are transmitted by a corresponding bonded channel node 222 may be decreased by 5 packets/second. Similarly, if a queue depth is below one or more thresholds, them the transmit rate from a corresponding node may be increased gradually.

In an example, the feedback signal is transmitted by scheduler 212 to a channel node 220 or a bonded channel node 222 using processor 214 via switch 210. Switch 210 may receive the feedback signal via, for example, a XAUI interface and transmit the feedback signal to processor 214 via, for example, a XAUI interface as well. Processor 214 may transmit the feedback signal to the targeted channel node 220 or bonded channel node 222 over, for example, a PCIe interface. It is to be appreciated that the type of interface is a design choice and may be arbitrary. In an embodiment, the traffic manager 208 is integrated with MAC units 206 and the feedback signal is directly transmitted by scheduler 212 to a channel node 220 or a bonded channel node 222. In an example, the feedback signal is a packet that includes a value by which the transmission rate is to be increased, decreased or maintained. The value is then stored in a register corresponding to the targeted channel node 220 or bonded channel node 222.

Figure 7:
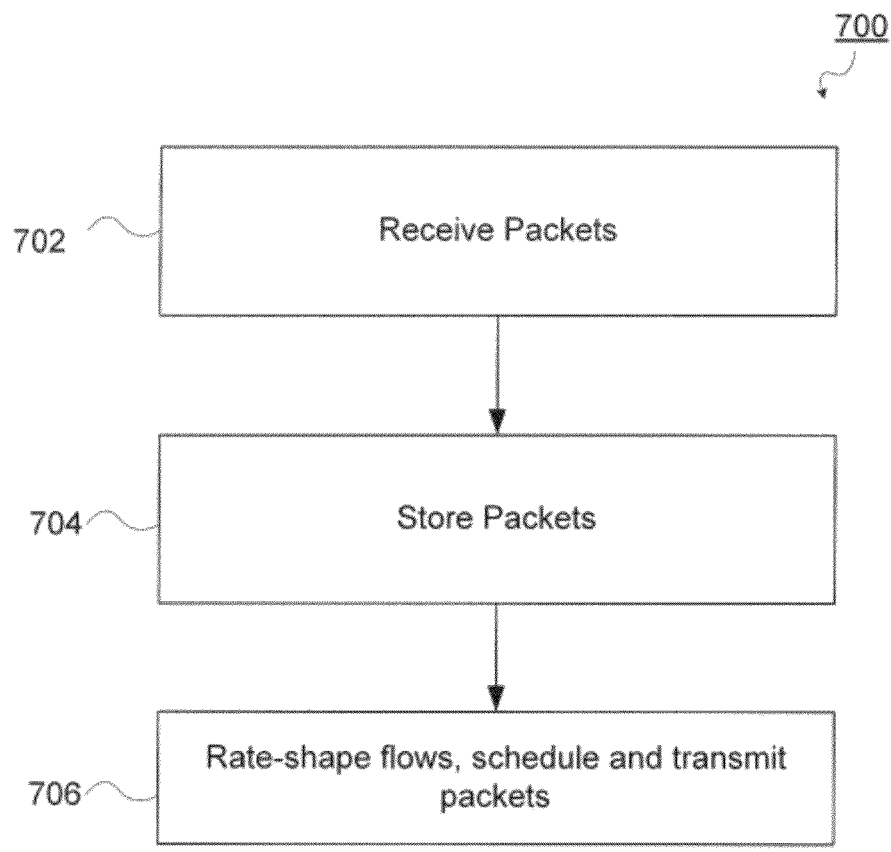
FIG. 7 illustrates an example flowchart illustrating steps performed by a traffic manager according to an embodiment of the invention.

FIG. 7 illustrates an example flowchart 700 illustrating steps performed by a traffic manager 208 according to an embodiment of the invention. Flowchart 700 will be described with continued reference to the example operating environment depicted in FIGS. 1-4. However, the flowchart is not limited to this embodiment. Note that some steps shown in flowchart 700 do not necessarily have to occur in the order shown. The steps in flow chart 700 may be performed by, for example, traffic manager 208.

In step 702, packets are received. For example, packets are received from classifier 210 of a MAC unit 206.

In step 704, packets are stored. For example, a packet is stored in a flow queue 218 based on the flow that the packet is associated with. The flow that a packet is associated with may be indicated by classification data appended to the packet by classifier 211.

In step 706, flows are rate shaped and packets are scheduled for transmission. For example, channel nodes 220 and bonded channel nodes 222 rate shape flows from flow queues 218. Channel nodes 220 and bonded channel nodes 222 also schedule packets for transmission from flow queues 218 to channel queues 204 or bonded channel queues 202 based on, for example, priority levels. For example, packets from a higher priority flows may be scheduled for transmission before packets from lower priority flows. Channel nodes 220 and bonded channel nodes 222 also transmit packets to channel queue 204 and bonded channel queues 202 based on guaranteed rates for a particular flow. The scheduling algorithms used by channel nodes 220 and bonded channel nodes 222 are programmable. Channel nodes 220 and bonded channel nodes 222 also adjust rates at which packets are transmitted from flow queues 218 to channel queues 204 or bonded channel queues 202 based on feedback signals received from scheduler 212 of MAC unit 206.

It is to be appreciated that the examples presented herein to schedule and rate-shape DOCSIS packets are applicable to any communication standard that perform rate shaping and/or scheduling.

In an example embodiment, traffic manager 208 and MAC units 206 may be combined into a single physical unit which may be referred to as a "traffic management unit" (not shown). In an example, the traffic management unit may operate using a single processor that is configured to perform the functions of both MAC units 206 and traffic manager 208. Alternatively, the traffic management unit may be a single physical device that includes multiple processors with a first processor implementing a functionality of MAC units 206 and a second processor implementing functionality of traffic manager 208.

Embodiments presented herein, or portions thereof, can be implemented in hardware, firmware, software, and/or combinations thereof. The embodiments presented herein apply to any communication system that uses authentication procedures for any type of service.

The representative functions described herein, for example, by traffic manager 208, MAC units 206 and processor 214 can be implemented in hardware, software, or some combination thereof. For instance, the method of flowcharts 500, 600 and 700 can be implemented using one or more computer processors, such as processor 214 based on instruction stored in memory 216, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the processing functions described herein could be embodied by computer program instructions that are executed by a computer processor, for example processor 214 based on instructions stored in memory 216, or any one of the hardware devices described herein. The computer program instructions cause the processor to perform the instructions described herein. The computer program instructions (e.g. software) can be stored in a computer usable medium, computer program medium, or any storage medium that can be accessed by a computer or processor. Such media include a memory device, such as memory 216, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A line card for managing traffic, comprising:
   a plurality of flow queues, each flow queue configured to store packets;
   a channel queue configured to transmit a first plurality of packets from a first associated flow queue of the plurality of flow queues over a single channel;
   a bonded channel queue configured to transmit a second plurality of packets from a second associated flow queue of the plurality of flow queues over multiple channels that form a bonded channel group;
   a bonded channel node coupled to the bonded channel queue and configured to control a rate at which the second plurality of packets from the second associated flow queue are transmitted to the bonded channel queue based on feedback data;
   a channel node coupled to the channel queue and configured to control a rate at which the first plurality of packets from the first associated flow queue are transmitted to the channel queue based on the feedback data; and
   a scheduler configured to schedule a time at which packets are transmitted from the channel queue or the bonded channel queue and to generate the feedback data based on a queue depth of the channel queue or the bonded channel queue.

2. The line card of claim 1, further comprising: a classifier configured to classify a packet of the first or second plurality of packets by appending classification data that indicates a flow that the packet of the first or second plurality of packets is associated with based on a class of service associated with the packet of the first or second plurality of packets.

3. The line card of claim 2, wherein the classifier is configured to send the packet to a flow queue of the plurality of flow queues to be buffered.

4. The line card of claim 1, wherein the scheduler is configured to schedule the first plurality of packets for transmission over the single channel or the second plurality of packets for transmission over the multiple channels.

5. The line card of claim 1, wherein the plurality of flow queues are further configured to direct the first plurality of packets or the second plurality of packets to the channel node or the bonded channel node, respectively, based on whether a flow associated with the first plurality of packets or the second plurality of packets is provisioned for transmission over the single channel or over the multiple channels.

6. The line card of claim 1, wherein the plurality of flow queues are configured to buffer overflow packets if the channel queue or the bonded channel queue is filled to capacity.

7. The line card of claim 1, wherein the channel node and the bonded channel node are configured to select an order in which packets from the plurality of flow queues are to be transmitted based on priority levels of the plurality of flow queues such that packets from higher priority flow queues from among the plurality of flow queues are transmitted before packets from lower priority flow queues from among the plurality of flow queues.

8. The line card of claim 2, wherein the classifier is configured to directly transmit a management packet to the channel queue or the bonded channel queue and to bypass storage of the management packet in a flow queue of the plurality of flow queues.

9. The line card of claim 8, wherein the management packet is a message that allocates upstream bandwidth and indicates transmit opportunities.

10. The line card of claim 1, wherein the scheduler is configured to generate the feedback data for the channel node and the bonded channel node based on a queue depth of the channel queue and bonded channel queue, respectively.

11. The line card of claim 1, wherein the channel node and the bonded channel node are configured to decrease a rate of transmission of packets to the channel queue or the bonded channel queue if a queue depth for the channel queue or the bonded channel queue, respectively, increases above one or more thresholds.

12. The line card of claim 1, wherein the channel node and the bonded channel node are configured to increase a rate of transmission of packets to the channel queue or bonded channel queue if a queue depth for the channel queue or bonded channel queue, respectively, decreases below one or more thresholds.

13. The line card of claim 1, wherein classification data associated with the packets indicates an order in which the channel node or the bonded channel node is to transmit the packets to the channel queue or the bonded channel queue, and wherein the classification data is based on flows that the packets correspond to and a class of service associated with the packets.

14. The line card of claim 2, further comprising a Media Access Control (MAC) unit, wherein the classifier is further configured to append a timestamp to the first plurality of packets or the second plurality of packets to indicate a time at which the first plurality of packets or the second plurality of packets is received by the MAC unit.

15. The line card of claim 14, wherein the scheduler is configured to schedule a time at which the first plurality of packets or the second plurality of packets is transmitted based on the timestamp, channel usage, channel queue depth or bonded channel queue depth and average queue latency for the channel queue or the bonded channel queue.

16. The line card of claim 1, wherein the packets from the plurality of flow queues are associated with a single channel node or a single bonded channel node.

17. The line card of claim 1, wherein a flow serviced by the line card is associated with the channel node or the bonded channel node based on a Quality of Service (QoS) parameter associated with the flow.

18. The line card of claim 1, wherein the channel node and the bonded channel node include a register, and wherein the feedback data is a feedback packet that is stored in the register of the channel node or the bonded channel node to control a rate at which the channel node or the bonded channel node is to transmit packets to the channel queue or bonded channel queue, respectively.

19. The line card of claim 1, wherein the channel node and the bonded channel node include a register, and wherein the register is configured to be used to program a rate at which the channel node or the bonded channel node is to receive data from the plurality of flow queues and a rate at which the channel node or the bonded channel node is to transmit data to the channel queue or bonded channel queue, respectively.

20. A method to manage packet traffic in a line card, comprising:
receiving a packet in a flow for transmission;
classifying the packet to the flow based on a class of service associated with the packet by appending classification data to the packet that indicates the flow;
storing the packet in a flow queue corresponding to the flow;
transmitting the packet from the flow queue to a channel queue or a bonded channel queue using a channel node or bonded channel node at a rate that is determined based on feedback data; and
scheduling transmission of the packet over a single channel if the packet is stored in the channel queue and over multiple channels that are bonded together to form a bonded channel group if the packet is stored in the bonded channel queue;
wherein feedback data to the channel node or the bonded channel node is adjusted based on a queue depth of the channel queue or the bonded channel queue, respectively.

21. The method of claim 20, further comprising determining an order of transmission of the packet to the channel queue or the bonded channel queue based on classification data that indicates a priority level of the flow.

22. The method of claim 20, further comprising decreasing the rate of transmission of the packet by the channel node or the bonded channel node to the channel queue or the bonded channel queue, respectively, if a queue depth for the channel queue or the bonded channel queue increases above one or more thresholds.

23. The method of claim 20, further comprising increasing the rate of transmission of the packet by the channel node or the bonded channel node to the channel queue or the bonded channel queue, respectively, if a queue depth for the channel queue or bonded channel queue decreases below one or more thresholds.

24. The method of claim 20, the classifying further comprising: appending a timestamp to the packet that indicates a time at which the packet is received by a Media Access Control (MAC) unit.

25. The method of claim 24, further comprising scheduling a time at which the packet is transmitted based on the timestamp.

26. The method of claim 20, further comprising associating packets from a plurality of flow queues with the channel node or the bonded channel node.

27. The method of claim 26, wherein an association of each flow queue from among the plurality of flow queues with the channel node or the bonded channel node is based on whether the flow corresponds to a single channel or a bonded channel group and on a Quality of Service (QoS) parameter associated with that flow.

28. The method of claim 20, further comprising: buffering the packet in the flow queue if the channel queue or the bonded channel queue is full.

29. The method of claim 20, further comprising changing an order in which packets are transmitted to the channel queue and the bonded channel queue based on priority of incoming packets as indicated by their associated classification data and wherein packets from higher priority flows are transmitted before packets from lower priority flows.

30. The method of claim 20, further comprising bypassing the channel node or the bonded channel node and directly sending a management packet to the channel queue or the bonded channel queue.

31. The method of claim 30, wherein the management packet is a packet that allocates bandwidth and transmission opportunities.

32. A line card for managing traffic, comprising:
a traffic manager that includes:
a plurality of flow queues, wherein each flow queue from among the plurality of flow queues is configured to store packets corresponding to a single flow;
a bonded channel node coupled to the plurality of flow queues and configured to rate-shape a flow from the plurality of flow queues for transmission over a bonded channel group based on feedback data;
a channel node coupled to the plurality of flow queues and configured to rate-shape a flow from the plurality of flow queues for transmission over a single channel based on the feedback data; and
a Media Access Control (MAC) unit coupled to the traffic manager, the MAC unit including:
a bonded channel queue coupled to the bonded channel node and configured to receive a first plurality of packets from the bonded channel node at a first rate based on the feedback data;
a channel queue coupled to the channel node and configured to receive a second plurality of packets from the channel node at a second rate based on the feedback data; and
a scheduler configured to schedule a time at which the first and second plurality of packets are to be transmitted from the channel queue and the bonded channel queue, respectively, and to send the feedback data to the channel node or the bonded channel node to control the first rate or the second rate at which the first plurality of packets are to be transmitted by the channel node or the second plurality of packets are to be transmitted by the bonded channel node, respectively.

33. The line card of claim 1, wherein the line card is a downstream line in a Cable Modem Termination System (CMTS).

* * * * *